(12) United States Patent
Winistoerfer

(10) Patent No.: US 8,132,334 B2
(45) Date of Patent: Mar. 13, 2012

(54) ROTATING CONSTRUCTION LASER WITH A DUAL GRADE MECHANISM

(75) Inventor: Martin Winistoerfer, Hinterforst (CH)

(73) Assignee: Leica Geosystems AG, Heerbrugg (CH)

(*) Notice: Subject to any disclaimer, the term of this patent is extended or adjusted under 35 U.S.C. 154(b) by 0 days.

(21) Appl. No.: 12/952,475

(22) Filed: Nov. 23, 2010

(65) Prior Publication Data

US 2011/0119937 A1    May 26, 2011

(30) Foreign Application Priority Data

Nov. 26, 2009  (EP) .................................. 09177262

(51) Int. Cl.
G01C 15/00 (2006.01)
G01B 11/26 (2006.01)

(52) U.S. Cl. ..................... 33/286; 33/273; 33/DIG. 21

(58) Field of Classification Search ................ 33/273, 33/276, 278, 281, 286, 290, DIG. 21
See application file for complete search history.

(56) References Cited

U.S. PATENT DOCUMENTS

| | | | |
|---|---|---|---|
| 5,485,266 A | 1/1996 | Hirano et al. | |
| 5,852,493 A | 12/1998 | Monnin | |
| 5,953,116 A | 9/1999 | Ohtomo et al. | |
| 6,073,353 A * | 6/2000 | Ohtomo et al. | 33/290 |
| 6,314,650 B1 | 11/2001 | Falb | |
| 6,598,304 B2 * | 7/2003 | Akers | 33/286 |
| 7,370,427 B2 | 5/2008 | Ammann et al. | |
| 2002/0144415 A1 * | 10/2002 | Dang et al. | 33/286 |
| 2004/0125356 A1 | 7/2004 | Connolly | |
| 2004/0187326 A1 | 9/2004 | Yung et al. | |
| 2005/0226306 A1 | 10/2005 | Glantz et al. | |
| 2005/0274030 A1 * | 12/2005 | Spanski et al. | 33/286 |
| 2008/0029792 A1 | 2/2008 | Kodaira | |

FOREIGN PATENT DOCUMENTS

WO     2008/052590     5/2008

OTHER PUBLICATIONS

European Patent Office, European Search Report in related European application No. 09 17 7262, completed Apr. 15, 2010.

* cited by examiner

*Primary Examiner* — G. Bradley Bennett
(74) *Attorney, Agent, or Firm* — Maschoff Gilmore & Israelsen

(57) ABSTRACT

A rotating construction laser includes a laser core module with a laser unit for emitting a laser beam and rotation means for rotating the laser beam around an axis of rotation defining a laser beam plane. The rotating construction laser is provided with an outer pivoting mechanism attached to the laser core module, the outer pivoting mechanism being operable to tilt the laser core module around an X-axis as a first axis of rotation and around a Y-axis as a second axis of rotation. The rotating construction laser further includes a dual grade mechanism with a first level sensor operable to indicate a rotation of the laser core module around the X-axis and a second level sensor operable to indicate a rotation of the laser core module around the Y-axis. Both level sensors can be operated mutually independent.

24 Claims, 5 Drawing Sheets

ROTATING CONSTRUCTION LASER WITH A DUAL GRADE MECHANISM

This application claims priority to European Patent Application No. EP09177262, filed on Nov. 26, 2009, the contents of which are hereby incorporated by reference herein.

The invention relates to a rotating construction laser comprising a laser core module with a laser unit for emitting a laser beam and rotation means for rotating the laser beam around an axis of rotation thus defining a laser beam plane. The rotating construction laser is provided with an outer pivoting mechanism attached to the laser core module, the outer pivoting mechanism being operable to tilt the laser core module around an X-axis as a first axis of rotation and around a Y-axis as a second axis of rotation. The rotating construction laser further comprises a dual grade mechanism with a first level sensor operable to indicate a rotation of the laser core module around the X-axis and a second level sensor operable to indicate a rotation of the laser core module around the Y-axis.

The invention also relates to a method of calibration of the dual grade mechanism and a method of generating a predefined laser beam plane for light emitted by the rotating construction laser according to the invention.

BACKGROUND

Rotating construction lasers are well known in the prior art. For example, in U.S. Pat. No. 7,370,427 a construction laser with at least one rotating laser beam defining a laser beam plane is described. The construction laser has a laser unit that is tiltable relative to a housing around at least one swiveling axis. The construction laser includes at least one level sensor which is sensitive to rotations around the swiveling axis for a highly precise orientation to the gravitational field. The device further includes one tilt sensor which is sensitive to rotations around the swiveling axis for direct measurement of an inclination angle relative to the gravitational field, with less resolution than the level sensor, but with a broader angular range that can be measured.

As a disadvantage of this embodiment, two sensors, a level sensor and a tilt sensor, are needed to measure tilt around one axis with an acceptable degree of accuracy. Furthermore, the laser beam unit periodically needs to return to its level position for recalibrating the tilt sensor.

WO 2008/052590 discloses a device for indicating a grade, for example in construction applications, using a laser beam. The laser beam is emitted from a laser unit to a desired direction having a grade angle with regard to the level angle. A level sensor is provided for adjusting the level angle and a grade sensor is provided for indicating a grade angle on the basis of the level angle from the level sensor. Thus, again two sensors are needed to correctly indicate the grade with respect to one axis of tilt.

According to U.S. Pat. No. 5,485,266, fixed tilt detectors are fixed in planes crossing perpendicularly to each other of a shaft center of a laser projector, and tilting tilt detectors are mounted on a plate which is tiltable with respect to the shaft center of the laser projector. The laser projector is level in such a manner that the fixed tilt detectors indicate horizontal direction. The tilting tilt detectors are aligned with the fixed tilt detectors and indicate a horizontal direction. Thus, a horizontal reference plane is obtained. The tilting tilt detectors are tilted with the fixed tilt detectors as a reference and the laser projector is leveled so that the tilting tilt detectors indicate horizontal direction. Thus, a reference plane tilted at an arbitrary angle is obtained.

This device also requires multiple tilt sensors.

In the prior art cited above, two tilt sensors are usually used for measuring the tilt of one axis of tilt of a rotating construction laser with high accuracy. One of these sensors is a level sensor which is of very high precision and very limited measurement range and typically used to calibrate the grade sensor or tilt sensor, which has a broader measurement range, but is less precise.

In U.S. Pat. No. 5,852,493 a self-aligning laser transmitter having a dual slope grade mechanism is disclosed. The laser transmitter includes a light source coupled to a frame which is suspended from a gimbal mechanism. The gimbal mechanism and the frame are coupled to a rotatable base. X and Y axes levelling devices are coupled to the gimbal mechanism and the frame to level the light source. A grade arm having two level sensors mounted at ninety degrees to one another is coupled to the frame. The grade arm is pivoted along the X or Y axes by a grade arm pivoting device. The X and Y axes leveling devices reposition the light source so that the level sensors are level thereby introducing a slope to the light source corresponding to the amount of pivot of the grade arm. The base may be rotated for a dual slope capability.

In this embodiment only two level sensors are used which, however, are mounted to the same grade arm. Consequently, upon a tilt of the grade arm caused by actuation of the X and Y axes levelling devices both level sensors are affected simultaneously. Hence, a precise calibration of the level sensors with regard to the X and Y axes is difficult. Typically a calibration with regard to either the X or the Y axis will be less precise than the other one.

In US 2008/0297921 a device for tilting the optical axis of a laser optical system is disclosed. Two tilt sensors are provided which are mounted on a common platform at an orientation of 90° with respect to each other. A gimbal mechanism supports tiltably the laser core module, comprising the laser light source and the beam-forming optical system of the laser. The gimbal mechanism also acts on the common platform of the two tilt sensors. Consequently, actuation of the X and Y axes levelling devices does affect both level sensors simultaneously also in this embodiment, again resulting in difficulties for a calibration of the level sensors with regard to tilting of the laser core module around the X and Y axes.

SUMMARY

It is an objective of the present invention to provide a rotating construction laser with a simplified grade mechanism. It is a particular objective of the invention to provide a grade mechanism using only one sensor per tilt axis and allowing the implementation of low-complex sensors for grade measurements. Simultaneously, the design of the grade mechanism should allow for easy and precise calibration of the sensors. Another objective of the invention is to provide a method for calibration of grade mechanism for a rotation construction laser according to the invention.

These objectives are achieved by the subject matter of the independent claims. Further advantageous embodiments of the invention are described in the dependent claims.

The rotating construction laser according to the invention comprises a laser core module and an outer pivoting mechanism attached to the laser core module. The laser core module includes a laser unit for emitting a laser beam and rotation means, like e.g. a rotating prism, for rotating the laser beam around an axis (Z) of rotation thus defining a laser beam plane. The outer pivoting mechanism is operable to tilt the laser core module around an X-axis as a first axis of rotation and around a Y-axis as a second axis of rotation, the X-axis and the Y-axis typically being perpendicular to each other.

Furthermore, the inventive rotation construction laser is provided with a dual grade mechanism comprising a first level sensor operable to indicate a rotation of the laser core module around the X-axis and a second level sensor operable to indicate a rotation of the laser core module around the Y-axis. The first and the second level sensors are designed to detect balance with respect to gravity. The two level sensors are individually attached to the laser core module, separately from one another. This ensures that really rotations or tilt of the laser core module are detected and not, for example, deformations of any intermediate connecting parts. According to the invention, the first level sensor is rotatable around a third axis of rotation assigned to that first level sensor, and the second level sensor is rotatable around a fourth axis of rotation assigned to that second level sensor, rotation of the individual level sensors around their assigned axes being mutually independent. Due to the mutually independent rotation of the level sensors around their related swivelling axes, any calibration errors will typically be equally small. The sensors may be attached by means of a pivot bearing directly to the laser core module. The level sensors may also be mounted on a pin which is pivotably attached to the laser core module, or any other known technique for pivotable connection of the level sensors with the laser core module may be utilized. The related axis of rotation is determined by the specific mechanical realization of the connection of the level sensors with the laser core module.

Preferably, the axes of rotation for the level sensors are oriented in parallel to the X- and Y-axis of the outer pivoting mechanism. Thereby, the axis of rotation for the first level sensor may be connected to the X-axis of the outer pivoting mechanism for tilting the laser core module in one direction, and the axis of rotation for the second level sensor may be connected to the Y-axis of the outer pivoting mechanism for tilting the laser core module in another direction. In particular, the axis of rotation for the first level sensor may be oriented coaxially with the X-axis and the axis of rotation for the second level sensor is oriented coaxially with the Y-axis of the outer pivoting mechanism.

Accordingly the swivelling axes of the level sensors are preferably oriented perpendicular to one another.

In an advantageous embodiment, the axes for rotation of the level sensors pass through the centres of mass of the related level sensors. It is further advantageous if the level sensors have an elongate, barrel-type shape with a longitudinal axis, corresponding to the sensor orientation of rotational sensitivity, oriented perpendicular to the axis of rotation of the related level sensor. Symmetry of the level sensor with respect to its axis of rotation is preferred in order to avoid effects of rotations around the related axis on the reading of the sensor.

The level sensors may be provided as bubble vial sensors or spirit vials with a liquid in a receptacle. Based on said symmetric mounting of the level sensors, it is ensured that the bubble will be kept in the center with respect to their longitudinal axes. For the purposes of this invention, the level sensors are not necessarily provided as tilt sensors that can measure inclinations over a large measurement range, but as sensors with highly precise reading of deviations from their balance with respect to gravity, also known as detection of true horizon, with a typical measurement range of about 1° or less tilt deviating from balance. Such level sensors have been commonly used in self-levelling construction lasers where only indication of true horizon, i.e. balance with respect to gravity, is required.

For precise, automated level measurements and adjustments it is preferred that the level sensors are provided with an opto-electronic readout system. The opto-electronic readout system may comprise a light source, preferably a laser diode or a light-emitting diode (LED), illuminating the liquid enclosed together with the bubble in the level sensor. The light passing through the sensor and being deviated in different manners by regions filled with liquid and regions occupied by the bubble in the sensor is detected by a light-sensitive device like a photodiode or a one- or two-dimensional diode or CCD array capable of detecting deviations from a symmetric distribution of the transmitted light. Any deviation from a symmetric transmitted light distribution may be scaled according to a requested resolution.

In an advantageous embodiment rotations around the swivelling axes of the level sensors are actuated by a mechanical drive system comprising a bearing system and a motor connected to the axis of rotation for the related level sensor. The mechanical drive system can be attached directly onto the axis of rotation, or it could be connected to the swivelling axis by a lever arm with a linear drive mechanism such as a lead screw, or any other variations of the drive mechanism may be utilized. The motor, typically an electric motor, may be operated by a control unit.

It is further preferred that the mechanical drive system is provided with a feedback mechanism for recording and monitoring motor-actuated rotation of the swivelling axis. The feedback mechanism may comprise an optical encoder or any adequate detection device like a linear sensor attached between level sensor and the laser core module operable to record the actuation of the swivelling axis scalable to an angle of rotation of the swivelling axis. Alternatively or additionally, the feedback mechanism may comprise a rotary optical encoder.

In an advantageous embodiment, the electric motor and the feedback mechanism are operated by the control unit according to a closed-loop principle, i.e. information/data for motor actuation sent by the control unit to the electric motor and positional data received by the control unit from the feedback mechanism are correlated. If, for example, the electric motor is provided as a stepper motor, a number of steps of the motor can be translated into a corresponding angular rotation of the swivelling axis. The advantage of such a closed-loop principle of operation is that the correlation between angular position of the swivelling axis and the operating position of the motor is maintained at least as long electric power is not interrupted.

The mechanical drive system may also be operated without feedback control or following an open-loop principle of operation, however upon compromising the advantage of high repeatability and accuracy resulting from closed-loop operation under feedback: When using a stepper motor for axis actuation, steps can be lost because of mechanical shock or failure in the electronics. When operated according to an open-loop principle, information about such a loss of motor steps cannot be further correlated with the actual axis position.

It is also advantageous if also the outer pivoting mechanism for tilting the laser core module is controlled by the control unit.

In another advantageous embodiment, the rotating construction laser is provided with a storage medium and a calibration data table stored in the storage medium. The calibration data table of this embodiment includes the following entries:

1. A first set of calibration data for a first calibration point obtained with the laser core module being mounted on an XY-axes tilt table with defined first values of tilt around the X-axis and the Y-axis;

2. a second set of calibration data for the first calibration point obtained after activation of the mechanical drive system for the axes of rotation for the level sensors in order to rotate the level sensors into balance with respect to gravity, the motor-actuated rotation of the axes until reach of balance of the level sensors with respect to gravity being recorded by the feedback mechanism and stored in the storage medium as data equivalent to angular rotations around the X-axis and the Y-axis, as the second set of calibration data.

The calibration data table may contain corresponding first and second sets of calibration data for a second calibration point and, if necessary, for still further calibration points. Usually, the calibration data table will comprise data for calibration points at several tilt positions thus representing a two-dimensional mesh of calibration points.

In a typical mode of operation, for generating a pre-defined laser beam plane, with a predefined tilt with respect to a horizontal plane, i.e. with a predefined tilt of the laser core module around the X- and the Y-axis, the first and the second level sensor are first rotated relative to the core module around their related third and fourth axis of rotation by pre-set angular amounts, dependent on the pre-defined laser beam plane. Then the laser core module is rotated by the outer pivoting system around the X- and Y-axis until reach of balance of the first and second level sensor, reach of balance being indicated by signal readout of the first and second level sensor corresponding to true horizon position.

In a preferred mode of operation of an automated system, the dual grade mechanism of the rotating construction laser having been calibrated, a user will enter values for requested tilt of the laser core module around the X- and Y-axis into a computer system operating the rotating construction laser, these values being supplied to the control unit.

The control unit will actuate the motors for rotating the level sensors around their related swivelling axes by angular amounts equivalent to the preset values of tilt of the laser core module around the X- and/or Y-axis. The amounts for rotation of the level sensors around the third and fourth swivelling axis may be retrieved from a stored calibration data table. However, also any other type of calibration of rotations around the axes holding the level sensors scaled to angular rotation may be utilized (e.g. rotations of a lead screw). When the pre-defined positions of the level sensors are reached the control unit 25 will actuated the outer pivoting system and rotate the laser core module around the X- and Y-axis until balance of the level sensors is reached again. Thereby, signals of the level sensors are acquired by the associated opto-electronic read-out system and fed to the control unit which maintains rotation of the laser core module until signal readout indicating true horizon position of both level sensors is reached. Thus, a pre-defined tilted laser beam plane for light emitted by the rotating construction laser is generated.

As a special positioning of the laser core module, a so-called lay-down functionality can be performed if rotation of the laser core module around the X- or the Y-axis by 90° is prompted. For that purpose, initially either the first or the second level level sensor is rotated relative to the core module around the related third or fourth axis of rotation by an amount according to a 90° turn whereas the other level sensor is maintained in a 0° turn position. Then the laser core module is rotated around the X- and/or Y-axis until reach of signal readout of both the first and second level sensor corresponding to true horizon position. Typically, this is performed in two steps. First, the laser core module is turned by about 90° manually, followed by fine-adjustment using rotation actuated by the outer pivoting system. However, if the outer pivoting system is operable over such a large range up to 90° angular rotation, also the complete step of 90° rotation may be performed under control of the outer pivoting system. In this way, a vertical laser beam plane is generated.

The described dual grade mechanism is always capable to restore the laser core module with the associated level sensors in a predefined position with respect to the horizontal force if, e.g. by moving the system, balance with respect to gravity (i.e. true horizon position of the level sensors) has been lost: Because of the known relationship between the setting of the X- and Y-axis of the outer pivoting mechanism and the positioning of the swivelling axes of the level sensors, deviations of the reading of the level sensors from true horizon reading are registered, and the laser core module is re-adjusted by tilting around the X- and Y-axis, until readout of the level sensor signals corresponding to their true horizon position is reached again. In this way the rotating construction laser with the dual grade mechanism according to the invention is provided with an automatic re-adjustment functionality.

In an embodiment for basic requirements, the rotating construction laser is provided as a self-levelling true horizon construction laser and rotation of swivelling axis of the level sensors and/or an optional calibration of the level sensors is performed manually without operation under an electronic control.

However, it is preferred that a rotation of the level sensors around the related swivelling axes is actuated by a mechanical drive system, comprising a bearing system and a motor, connected to the axes of rotation, as described before.

A further subject of the invention is a method of calibration of a dual grade mechanism for a rotating construction laser. Different types of calibration hardware can be utilized, and the inventive method is not limited to the specific hardware configuration disclosed in the following.—The essential steps of the inventive calibration method are as follows:

As a first step, the laser core module is mounted onto a two-axes tilt system, such as an XY-axes tilt table, as a calibration standard device. Preferably, for the calibration procedure a high-accuracy tilt table is used. The tilt table itself is calibrated for zero-tilt with respect to the X- and Y-axis for true horizon position.

As a second step, for generating data for a first calibration point, the tilt table is adjusted at a first defined pair of values for tilt around the X- and the Y-axis. These XY-tilt values are recorded as a first set of calibration data for the first calibration point.

Then, as a third step, the level sensors are rotated around their related swivelling axes into balance with respect to gravity, corresponding to "true horizon" orientation of the level sensors. In case of a bubble vial sensor with at least one transparent window this position is indicated by location of the bubble in the middle of the window. The amount of rotation around the swivelling axes of the level sensors until reach of balance with respect to gravity is recorded for the rotations of both level sensors as a second set of calibration data for the first calibration point. This second set of calibration data is an equivalent to the first set of calibration data for angular tilt of the X- and Y-axes away from true horizon position of the XY-tilt table.

The third step of the calibration method may be performed by manual or motor-actuated rotation of the swivelling axes of the level sensors and reading/manual recording of a scale attached to the axes showing the performed angular rotation.

However, it is preferred that the rotation of the swivelling axes is effected by means of an associated mechanical drive system comprising a bearing system and a motor connected to the respective axis of rotation for a level sensor. The mechanical drive system may be attached directly onto the axis of rotation, or it could be connected to the swivelling axis by a lever arm with a linear drive mechanism such as a lead screw, or any other variations of the drive mechanism may be utilized. The motor, typically an electric motor, may be operated by a control unit.

It is further preferred that the mechanical drive system is provided with a feedback mechanism for recording and monitoring motor-actuated rotation of the swivelling axis. The feedback mechanism may comprise an optical encoder or any adequate detection device like a linear sensor attached between level sensor and the laser core module operable to record the actuation of the swivelling axis scalable to an angle of rotation of the swivelling axis.

In this preferred embodiment of the calibration method, the feedback mechanism provides the data for recorded motor-actuated rotation of the axes as data equivalent to angular rotations around the X-axis and the Y-axis, as the second set of calibration data for the first calibration point.

Steps 2 and 3 of the calibration method may be repeated for second defined values of tilt around the X-axis and the Y-axis in order to obtain first and second sets of calibration data for a second point of calibration, and optionally steps 2 and 3 may be further repeated for obtaining sets of calibration data for still further calibration points.

For the special situation of zero-tilt around the X- and the Y-axis, the true horizon position of the level sensors, corresponding to their balance with respect to gravity, is defined.

The calibration data may be stored in a calibration data table. The calibration data table may be stored in a storage medium included in the inventive dual grade mechanism. The calibration data table may also be first stored in a storage unit of the calibration standard device and then be transformed into an adequate format for a calibration data table to be made available for the laser control unit of the rotating construction laser.

BRIEF DESCRIPTION OF THE FIGURES

It is pointed out that the specific advantageous embodiments of the various aspects of the invention disclosed above can be freely combined to further embodiments within the scope of the invention.

The invention will further be explained in detail by referring to exemplary embodiments that are accompanied by figures, in which.

DETAILED DESCRIPTION

Figure 1:
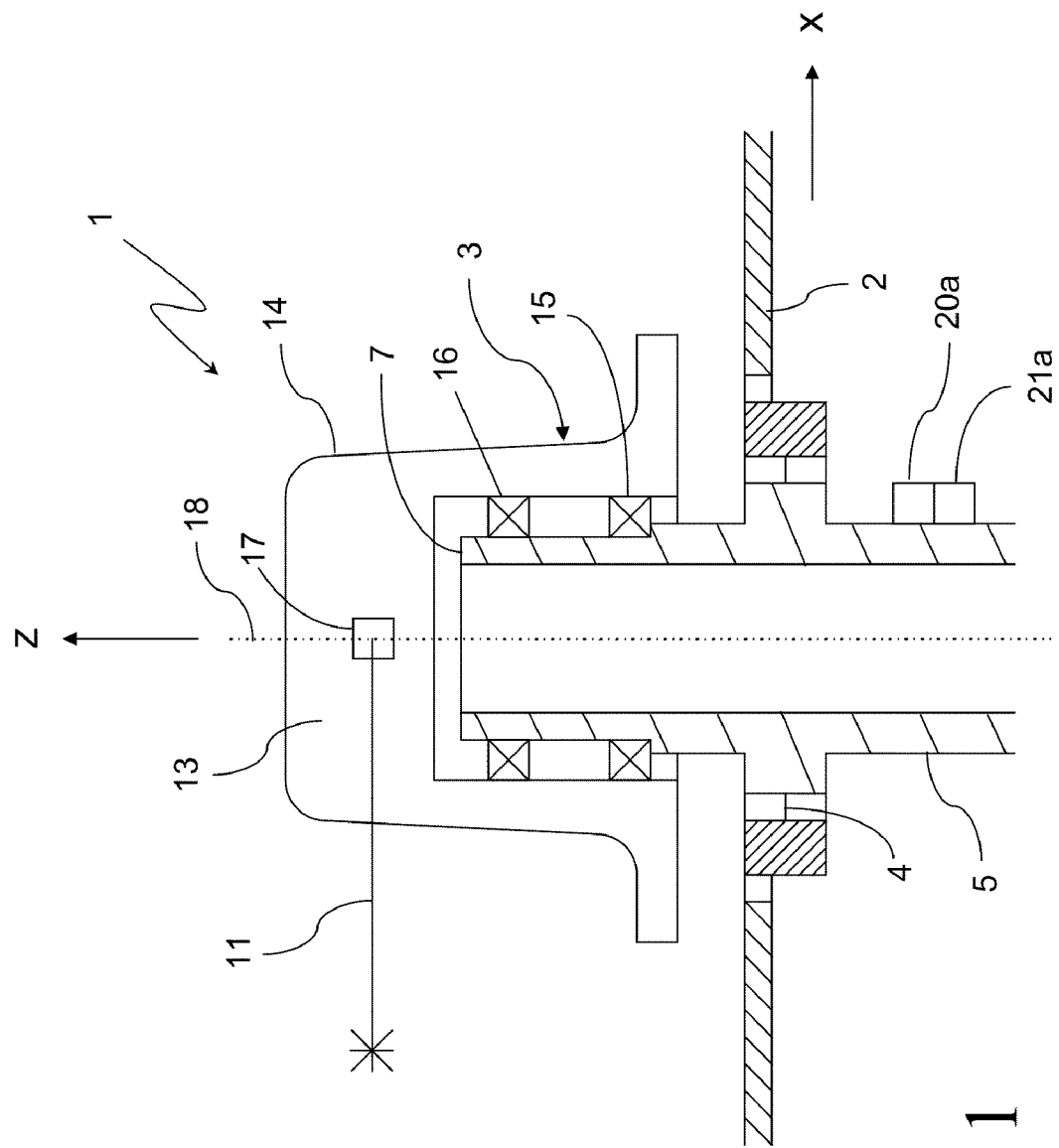
FIG. 1 and FIG. 2 show cross-sectional views of a possible embodiment of a rotating construction laser provided with a dual grade mechanism according to the invention.
Figure 2:
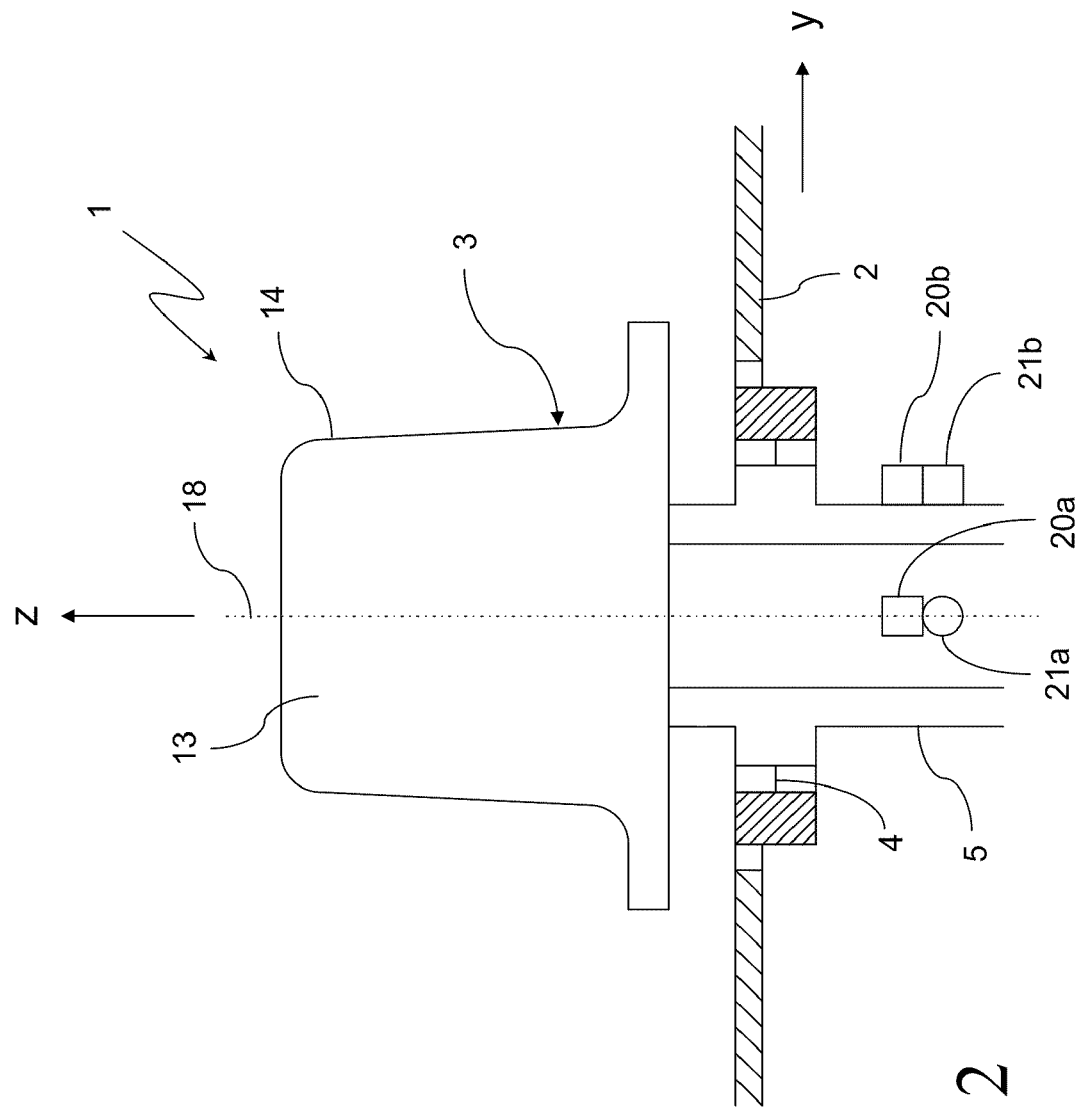

In FIG. 1 and FIG. 2, a rotating construction laser 1 is shown in two views—one from the front and one from the right hand side. The construction laser 1 comprises a base 2 in form of a housing. A laser unit 3—as a means for generating a laser beam plane—is pivotably mounted to the base 2 using a pivoting system 4 that may be a spherical joint or a gimbal. The pivoting system 4 allows the laser unit 3 to swivel around an X- and a Y-axis—and thus to be tilted in two directions. The laser unit 3 comprises a hollow axle 5 and a head assembly 13 including an optically transparent hood 14 that is rotatably around an axis 18 mounted to the axle 5 using two bearings 15, 16. The pivoting system 4 is attached to the axle 5 approximately at midsection. The axle 5 has a lower end (not shown) and an upper end 7. A laser collimator unit (not shown) is located in the interior of the hollow axle 5 at the lower end. The laser collimator unit comprises a laser diode and a collimator (both not shown). The laser collimator unit generates a collimated laser beam 11 that is directed along a center line of the axle 5 which is concentric with the axis 18 towards the head assembly 13. A laser beam redirector 17 in the form of a prism is integrated into the hood 14. The laser beam redirector 17 changes the direction of the laser beam 11 by an angle of 90°. Since the laser beam redirector 17 is rotated with the hood 14, a laser beam plane is generated in which the laser beam 11 rotates around the axis 18 of rotation. Typically, the hood 14 is rotated at a speed of several thousand revolutions per minute (rpm).

In the embodiment illustrated by FIG. 1 and FIG. 2, level sensors 20a, 20b are mounted on axes of rotation 21a, 21b which are directly connected with the axle 5. The sensors may be attached by means of a pivot bearing (not shown). The level sensors 20a, 20b may also be mounted on pins as swivelling axes 21a, 21b which are pivotably attached to the axle 5 or the laser core module 19 (cf. FIG. 3 and FIG. 4), or any other known technique for pivotable attachment of the level sensors 20a 20b may be utilized. The related axis of rotation 21a, 21b is determined by the specific mechanical realization of the attachment of the level sensors 20a, 20b.

It is emphasized that the rotating construction laser of FIG. 1 and FIG. 2 is only shown for the purpose of exemplary, general technical illustration for visualizing the general functional components of a rotating construction laser and does not limit the scope of the invention.

Figure 3:
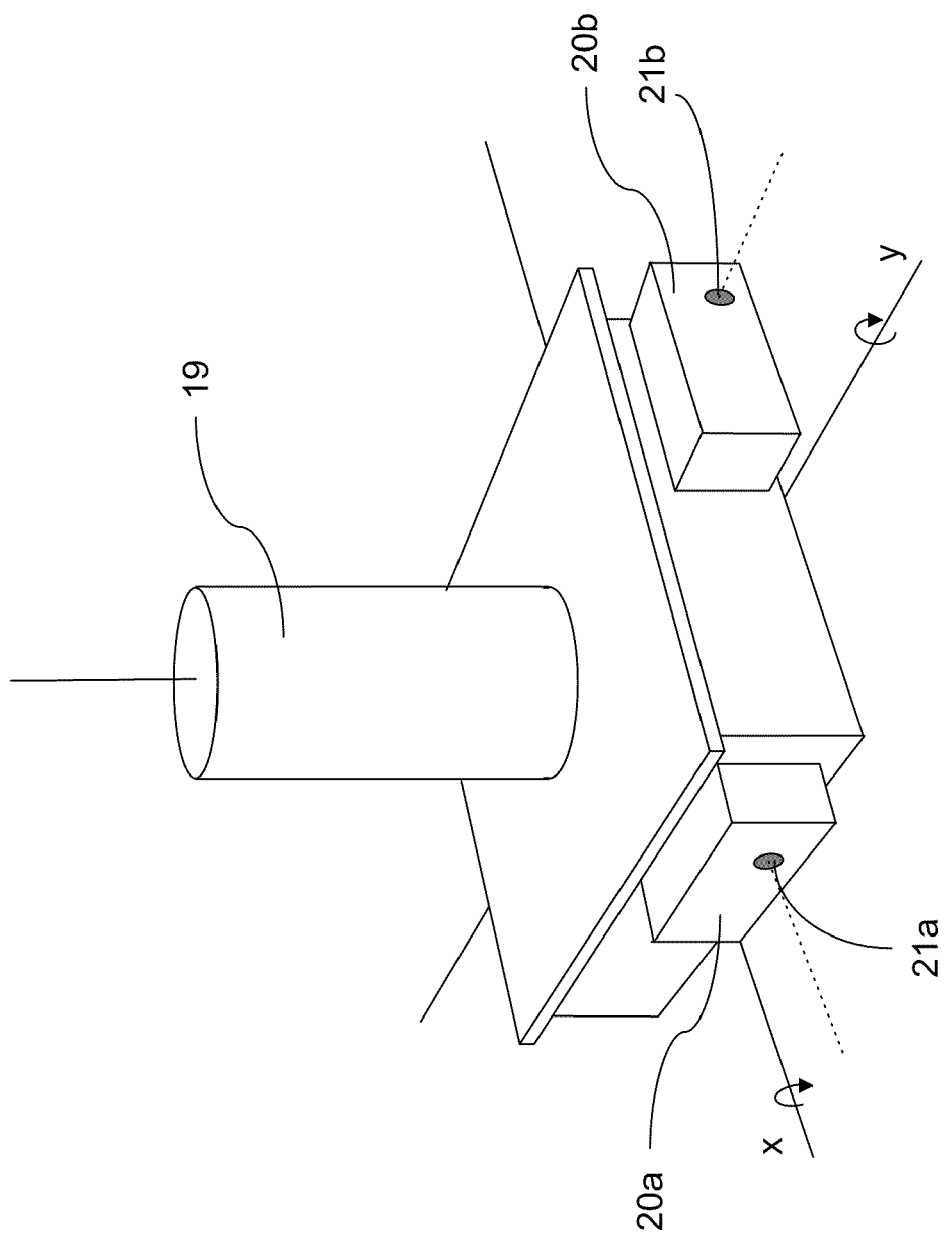
FIG. 3 and FIG. 4 show simplified illustrations of a rotational construction laser according to the invention provided with a dual grade mechanism.

FIG. 3 shows a simplified illustration of a rotational construction laser according to the invention provided with a dual grade mechanism. Instead of the detailed illustration of a rotational construction laser 1 as shown in FIG. 1 and FIG. 2, a laser core module 19 comprising essential components of a rotational construction laser as exemplified in FIG. 1 and FIG. 2 is depicted in FIG. 3.

The dual grade mechanism comprises a first level sensor 20a operable to indicate a rotation of the laser core module 19 around the X-axis and a second level sensor 20b operable to indicate a rotation of the laser core module 19 around the Y-axis. The first and the second level sensors 20a, 20b are designed to detect balance with respect to gravity. The first level sensor 20a is rotatable around a third axis of rotation 21a assigned to that first level sensor 20a, and the second level sensor 20b is rotatable around a fourth axis of rotation 21b assigned to that second level sensor 20b, rotation of the individual level sensors 20a, 2b around their related swivelling axes 21a, 21b being mutually independent, without affecting the reading of the other sensor not being rotated.

The level sensors 20a, 20b may be attached by means of a pivot bearing directly to the laser core module 19. The level sensors may 20a, 20b also be mounted on a pin which is pivotably attached to the laser core module 19, or any other known technique for pivotable connection of the level sensors 20a, 20b with the laser core module 19 may be utilized. The related axis of rotation 21a, 21b is determined by the specific mechanical realization of the connection of the level sensors 20a, 20b with the laser core module 19.

Preferably, the axis of rotation 21a for the first level sensor 20a is oriented in parallel to the X-axis of the outer pivoting mechanism for tilting the laser core module 19 in one direction, and the axis of rotation 21b for the second level sensor 20b is oriented in parallel to the Y-axis of the outer pivoting mechanism for tilting the laser core module 19 in another direction.

The level sensors 20a, 20b may be provided as bubble vial sensors or spirit vials with a liquid in a receptacle. For precise, automated level measurements and adjustments it is advantageous if the level sensors 20a, 20b are provided with an opto-electronic readout system. The opto-electronic readout system may comprise a light source, preferably a laser diode or a light-emitting diode (LED), illuminating the liquid enclosed together with the bubble in the level sensor. The light passing through the sensor and being deviated in different manners by regions filled with liquid and regions occupied by the bubble in the sensor is detected by a light-sensitive device like a photodiode or a one- or two-dimensional diode or CCD array capable of detecting deviations from a symmetric distribution of the transmitted light. The light-sensitive device has the functionality of a linear image sensor. Any deviation from a symmetric transmitted light distribution may be scaled according to a requested resolution.

Figure 4:
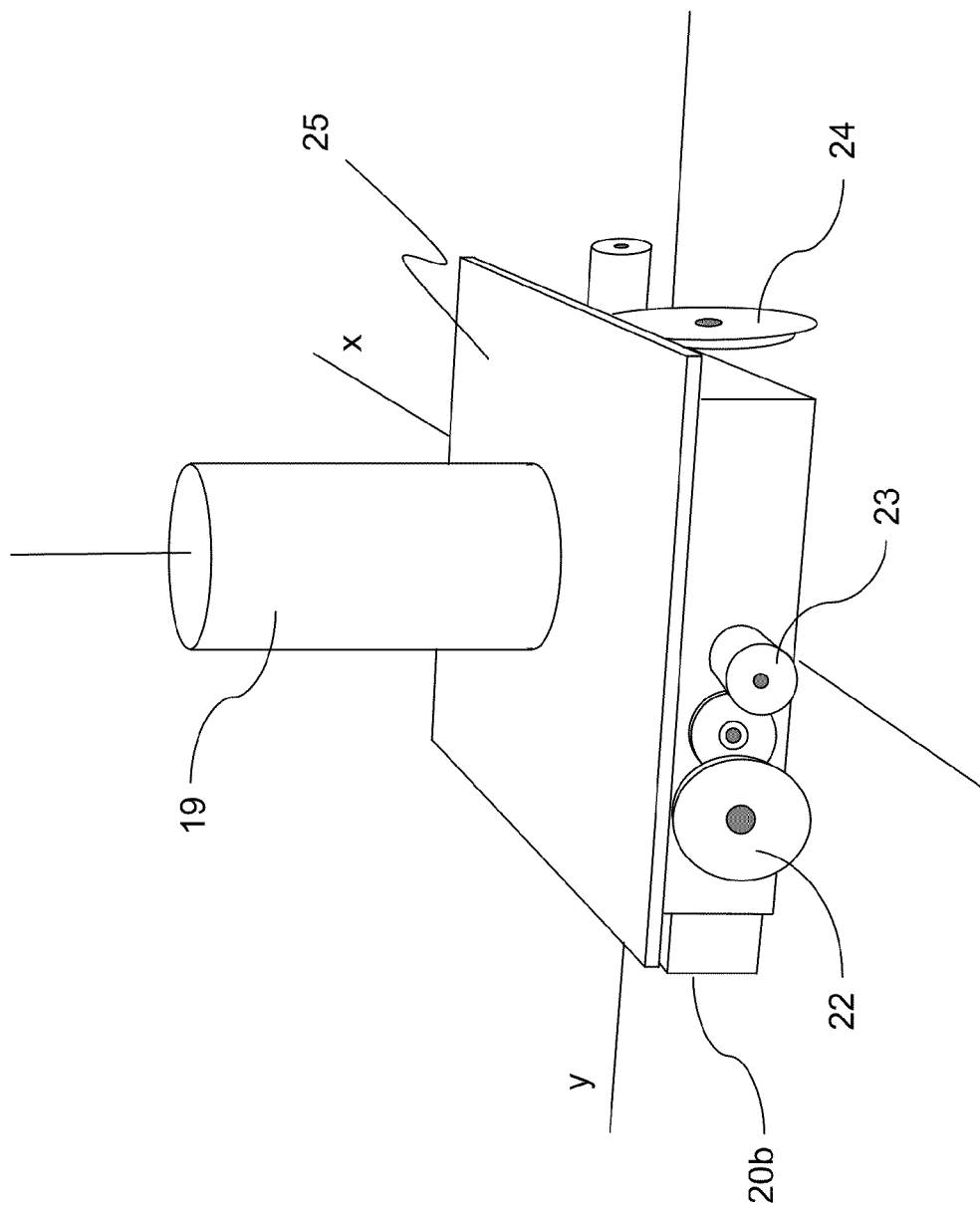

FIG. 4 illustrates a preferred embodiment of the rotating construction laser according to FIG. 3, wherein rotations around the swivelling axis 21a, 21b of a level sensor 20a, 20b are actuated by a mechanical drive system comprising a bearing system 22 and a motor 23 connected to the axis of rotation 21a, 21b for the level sensor 20a, 20b. The mechanical drive system can be attached directly onto the axis of rotation 21a, 21b, or it could be connected to the swivelling axis 21a, 21b by a lever arm with a linear drive mechanism such as a lead screw, or any other variations of the drive mechanism may be utilized. The motor, typically an electric motor, may be operated by a control unit.

It is further preferred that the mechanical drive system is provided with a feedback mechanism 24 for recording and monitoring motor-actuated rotation of the swivelling axis 21a, 21b. The feedback mechanism 24 may comprise an optical encoder or any adequate detection device like a linear sensor attached between level sensor 20a, 20b and the laser core module (19) operable to record the actuation of the swivelling axis 21a, 21b scalable to an angle of rotation of the swivelling axis 21a, 21b.

Preferably the electric motor 23 and the feedback mechanism 24 are operated by a control unit 25 according to a closed-loop principle, i.e. information/data for motor actuation sent by the control unit 25 to the electric motor 23 and positional data received by the control unit 25 from the feedback mechanism 24 are correlated. If, for example, the electric motor 23 is provided as a stepper motor, a number of steps of the motor can be translated into a corresponding angular rotation of the swivelling axis 21a, 21b. The advantage of such a closed-loop principle of operation is that the correlation between angular position of the swivelling axis 21a, 21b and the operating position of the motor 23 is maintained at least as long electric power is not interrupted.

The mechanical drive system may also be operated without feedback control or following an open-loop principle of operation, however upon compromising the advantage of high repeatability and accuracy resulting from closed-loop operation under feedback: When using a stepper motor for axis actuation, steps can be lost because of mechanical shock or failure in the electronics. When operated according to an open-loop principle, information about such a loss of motor steps cannot be further correlated with the actual axis position.

It is further advantageous if also the outer pivoting mechanism for tilting the laser core module 19, such as a pivoting system 4 as indicated in FIG. 1 and FIG. 2, is controlled by the control unit 25.

Figure 5B:
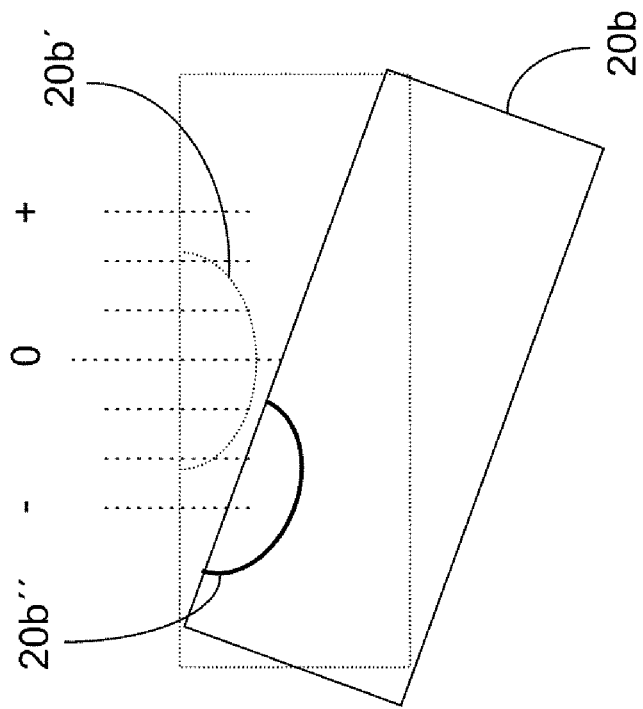
FIG. 5a and FIG. 5b illustrate the indications of bubble vial sensors as an example of level sensors upon rotation around one swiveling axis.
Figure 5A:
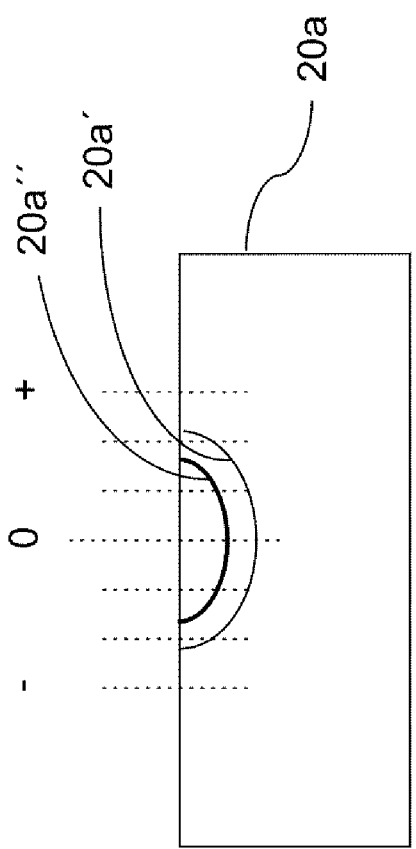

FIG. 5a and FIG. 5b illustrate the indications of bubble vial sensors as an example of level sensors 20a, 20b upon a rotation of the laser core module 19 together with the level sensors 20a, 20b around the Y-axis by the outer pivoting system. It has to be understood that the displayed scales (−, 0, +) are only dedicated for purposes of illustration without a numerical scaling. In an ideal situation, the longitudinal axes of the level sensors 20a, 20b and the related axes of rotation 21a, 21b are perfectly aligned in parallel with the X- and Y-axis of rotation of the laser core module 19, the X- and Y axis and consequently also the axes of rotation 21a, 21b of the level sensors 20a, 20b being orientated orthogonal to one another.

The lines 20a', 20b' show the indication of sensors 20a, 20b when both swivelling axes are set in zero position for the sensors 20a, 20b, and the related sensors display balance with respect to gravity. The bold lines 20a" and 20b" illustrate the sensor reading after a rotation around swivelling axis 21a on which sensor 20a is mounted: The indication of sensor 20a is still symmetric with respect to zero reading. The bubble has only rolled by a certain amount ("transversal roll") perpendicular to the sensor longitudinal axis in the tilt plane. In contrast the indication of sensor 20b shows a departure from the zero value reading corresponding to the degree of tilt around axis 21a, whereas, no "transversal roll" of the bubble has occurred, orientation with respect to swivelling axis 21b having not been changed.

The level sensor reading as illustrated in FIG. 5a, FIG. 5b corresponds to the regular case that the longitudinal level sensor axis, corresponding to the sensor orientation of rotational sensitivity, is oriented perpendicular to the axis of rotation of the related level sensor and the related axis (X or Y) of rotation by the outer pivoting system. In case that the level sensors would be mounted in a perpendicular orientation, i.e. with their longitudinal axis in parallel to the axis of rotation, the reading displayed in FIG. 5a, FIG. 5b would correspond to a rotation about the X axis. Such an exchange of symmetry of sensor orientation would, however, only correspond to an exchange of sensitivity for rotations around the X- and Y-axis without leaving the scope of the invention.

What is claimed is:

1. A rotating construction laser comprising:
   a laser core module including:
      a laser unit for emitting a laser beam and rotation means for rotating the laser beam around an axis of rotation thus defining a laser beam plane;
      an outer pivoting mechanism attached to the laser core module, the outer pivoting mechanism being operable to tilt the laser core module around an X-axis as a first axis of rotation and around a Y-axis as a second axis of rotation; and
      a dual grade mechanism including a first level sensor operable to indicate a rotation of the laser core module around the X-axis and a second level sensor operable to indicate a rotation of the laser core module around the Y-axis, the first and the second level sensors being designed to detect balance with respect to gravity, wherein:
         the first level sensor and the second level sensor are individually attached to the laser core module;

the first level sensor is rotatable around a third axis of rotation;

the second level sensor is rotatable around a fourth axis of rotation; and a rotation of the first and second level sensor around the related third and fourth axis of rotation is mutually independent.

2. A rotating construction laser according to claim 1, wherein the third and fourth axis of rotation of the first and second level sensors are oriented in parallel to the X-axis and Y-axis, respectively, of rotation of the core laser module.

3. A rotating construction laser according to claim 1, wherein the third and fourth axis of rotation of the first and second level sensors are oriented coaxially to the X-axis and Y-axis, respectively, of rotation of the core laser module.

4. A rotating construction laser according to claim 1, wherein the first and the second level sensors have a center of mass each, and the third and the fourth axis of rotation pass through the centers of mass of the first level sensor and the second level sensor respectively.

5. A rotating construction laser according to claim 1, wherein the first and the second level sensors are provided as bubble vial sensors with a liquid and a bubble in a receptacle, the receptacle having a symmetrical and elongate, barrel-type shape.

6. A rotating construction laser according to claim 5, wherein the first and the second level sensors are provided with an opto-electronic readout system.

7. A rotating construction laser according to claim 6, wherein the opto-electronic readout system comprises a light source illuminating the liquid enclosed together with the bubble in the level sensor, the illuminating light passing through the sensor and being deviated as transmitted light in different manners by regions filled with liquid and regions occupied by the bubble in the level sensor, wherein the opto-electronic read-out system further comprises, for a detection of the transmitted light, a light-sensitive device capable of detecting deviations from a symmetric distribution of the transmitted light.

8. A rotating construction laser according to claim 6, wherein the opto-electronic readout system comprises a laser diode or a light-emitting diode illuminating the liquid enclosed together with the bubble in the level sensor, the illuminating light passing through the sensor and being deviated as transmitted light in different manners by regions filled with liquid and regions occupied by the bubble in the level sensor, wherein the opto-electronic read-out system further comprises, for a detection of the transmitted light, a light-sensitive device capable of detecting deviations from a symmetric distribution of the transmitted light, the light-sensitive device being a photodiode or a one- or two-dimensional diode or CCD array.

9. A rotating construction laser according to claim 1, wherein rotation around the third and/or fourth axis of rotation is operable by a mechanical drive system, comprising a bearing system and a motor, connected to said axis of rotation.

10. A rotating construction laser according to claim 9, wherein the mechanical drive system is provided with a feedback mechanism and operable by a control unit for controlling motor-actuated rotation around the third and/or fourth axis of rotation.

11. A rotating construction laser according to claim 9, wherein the mechanical drive system is provided with a feedback mechanism and operable by a control unit for controlling motor-actuated rotation around the third and/or fourth axis of rotation, wherein the feedback mechanism comprises an optical encoder, which is provided as a linear sensor attached between level sensor and the laser core module operable to record the actuation of the swivelling axis scalable to an angle of rotation of the swivelling axis, or as a rotary optical encoder.

12. A rotating construction laser according to claim 10, wherein the outer pivoting mechanism is operable by the control unit.

13. A rotating construction laser according to claim 12, wherein the rotating construction laser is further provided with a storage medium and a calibration data table stored in the storage medium, the calibration data table including:

a first set of calibration data for a first calibration point obtained with the laser core module being mounted on an XY-axes tilt table with defined first values of tilt around the X-axis and the Y-axis;

a second set of calibration data for the first calibration point obtained after activation of the mechanical drive system for the third and fourth axis of rotation for the level sensors in order to rotate the level sensors into balance with respect to gravity, the motor-actuated rotation around the third and fourth axis until reach of balance of the level sensors with respect to gravity being recorded by the feedback mechanism and stored in the storage medium as data equivalent to angular rotations around the third and fourth axis, as the second set of calibration data.

14. A rotating construction laser according to claim 13, wherein the rotating construction laser is further provided with a storage medium and a calibration data table stored in the storage medium, the calibration data table including:

a first set of calibration data for a first calibration point obtained with the laser core module being mounted on an XY-axes tilt table with defined first values of tilt around the X-axis and the Y-axis;

a second set of calibration data for the first calibration point obtained after activation of the mechanical drive system for the third and fourth axis of rotation for the level sensors in order to rotate the level sensors into balance with respect to gravity, the motor-actuated rotation around the third and fourth axis until reach of balance of the level sensors with respect to gravity being recorded by the feedback mechanism and stored in the storage medium as data equivalent to angular rotations around the third and fourth axis, as the second set of calibration data;

a first set of calibration data for a second calibration point obtained with the laser core module being mounted on an XY-axes tilt table with defined second values of tilt around the X-axis and the Y-axis;

a second set of calibration data for the second calibration point obtained after activation of the mechanical drive system for the third and fourth axis of rotation for the level sensors in order to rotate the level sensors into balance with respect to gravity, the motor-actuated rotation around the third and fourth axis until reach of balance of the level sensors with respect to gravity being recorded by the feedback mechanism and stored in the storage medium as data equivalent to angular rotations around the third and fourth axis, as the second set of calibration data; and sets of calibration data for further calibration points.

15. A rotating construction laser according to claim 13, wherein the rotating construction laser is operable to generate a pre-defined laser beam plane for light emitted by the rotating construction laser by means of:

actuating motors by the control unit and rotating level sensors around their related axes of rotation by pre-set angular amounts;

actuating the outer pivoting system by the control unit and rotating the laser core module with the outer pivoting system around the X- and Y-axis until reach of balance of the level sensors, signals of the level sensors being acquired by the associated opto-electronic readout system and fed to the control unit; and maintaining rotation of the laser core module until signal readout indicating true horizon position of both level sensors is reached.

16. A rotating construction laser according to claim 13, wherein the rotating construction laser is operable to generate a pre-defined laser beam plane for light emitted by the rotating construction laser by means of:

actuating motors by the control unit and rotating level sensors around their related axes of rotation by pre-set angular amounts equivalent to data retrieved from a stored calibration data table;

actuating the outer pivoting system by the control unit and rotating the laser core module with the outer pivoting system around the X- and Y-axis until reach of balance of the level sensors, signals of the level sensors being acquired by the associated opto-electronic readout system and fed to the control unit; and maintaining rotation of the laser core module until signal readout indicating true horizon position of both level sensors is reached.

17. A rotating construction laser according to claim 15, wherein the rotating construction laser is provided with an automatic re-adjustment functionality for restoring the laser core module with the associated level sensors in a predefined position with respect to the gravitational force, by means of:

registering deviations of readings of the level sensors from values indicating balance with respect to gravity; and re-adjustment of the laser core module by tilting around the X- and Y-axis by means of the outer pivoting system operated by the control unit until reach of balance of the level sensors.

18. A rotating construction laser according to claim 1, wherein the rotating construction laser is provided as a self-levelling true horizon construction laser and a rotation around the third and/or fourth axis of rotation and/or a calibration of a level sensor is manually operable, without operation under an electronic control.

19. A method of calibration of a dual grade mechanism for a rotating construction laser according to claim 12, comprising the steps of:

mounting the laser core module of the rotation construction laser on an XY-axes tilt table;

setting and adjusting the XY-tilt table at first defined values of tilt around the X-axis and the Y-axis and recording these values as a first set of calibration data for a first calibration point;

activating the mechanical drive system for the third and fourth axis of rotation for the level sensors in order to rotate the level sensors into balance with respect to gravity;

recording with the feedback mechanism the motor-actuated rotation around the third and fourth axis until reach of balance of the level sensors with respect to gravity;

storing the recorded motor-actuated rotation around the third and fourth axis as data equivalent to angular rotations around said third and fourth axis, as the second set of calibration data for the first calibration point.

20. A method according to to claim 19, further comprising the steps of:

repeating the setting, activating, recording and storing steps for second defined values of tilt around the X-axis and the Y-axis in order to obtain first and second sets of calibration data for a second point of calibration;

further repeating the setting, activating, recording and storing steps for obtaining sets of calibration data for further calibration points; and storing the sets of calibration data for the calibration points on a storage medium.

21. A method of generating a pre-defined laser beam plane, with a predefined tilt with respect to a horizontal plane, for light emitted by a rotating construction laser according to claim 1, wherein:

the first and the second level sensors are rotated relative to the core module around their related third and fourth axis of rotation by pre-set angular amounts, dependent on the pre-defined laser beam plane; and the laser core module is rotated by the outer pivoting system around the X- and Y-axis until reach of balance of the first and second level sensor indicated by signal readout of the first and second level sensor corresponding to true horizon position.

22. A method according to claim 21, wherein:

motors are actuated by the control unit, and level sensors are rotated around their related axes of rotation by pre-set angular amounts;

the outer pivoting system is actuated by the control unit and the laser core module is rotated by the outer pivoting system around the X- and Y-axis until reach of balance of the level sensors, whereby signals of the level sensors are acquired by the associated opto-electronic readout system and fed to the control unit, and rotation of the laser core module is maintained until signal readout indicating true horizon position of both level sensors is reached.

23. A method according to claim 22, wherein:

motors are actuated by the control unit, and level sensors are rotated around their related axes of rotation by pre-set angular amounts equivalent to data retrieved from a stored calibration data table are rotated around their related swivelling axes;

the outer pivoting system is actuated by the control unit and the laser core module is rotated by the outer pivoting system around the X- and Y-axis until reach of balance of the level sensors, whereby signals of the level sensors are acquired by the associated opto-electronic readout system and fed to the control unit, and rotation of the laser core module is maintained until signal readout indicating true horizon position of both level sensors is reached.

24. A method according to claim 22 in order to generate a vertical laser beam plane, wherein:

the first or the second level level sensor is rotated relative to the core module around the related third or fourth axis of rotation by an amount according to a 90° turn whereas the other level sensor is maintained in a 0° turn position; and the laser core module is around the X- and/or Y-axis until reach of signal readout of both the first and second level sensor corresponding to true horizon position.

* * * * *